May 4, 1965
H. B. NANKERVIS
3,182,322
RADAR ANTENNAE
Filed March 6, 1962
2 Sheets-Sheet 1
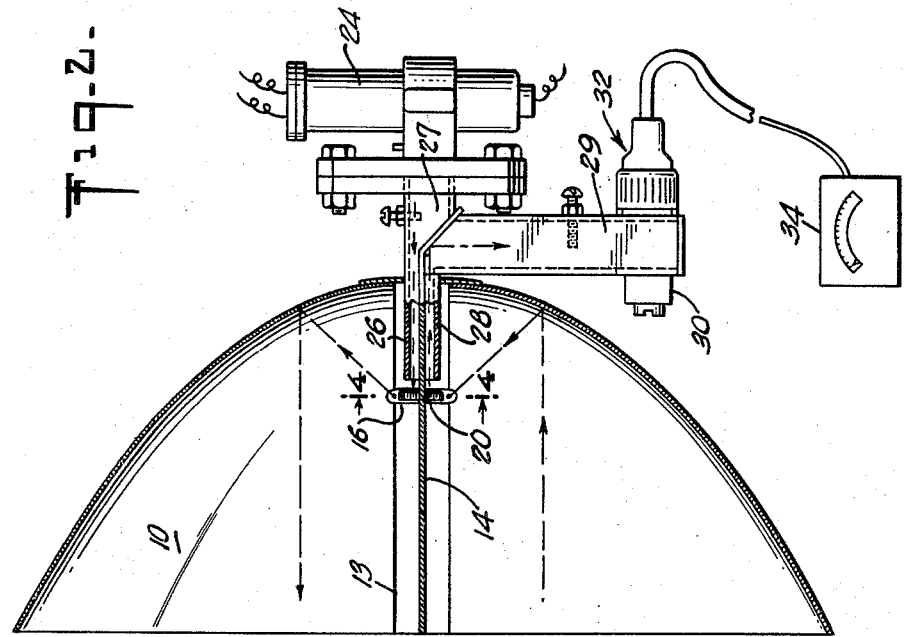
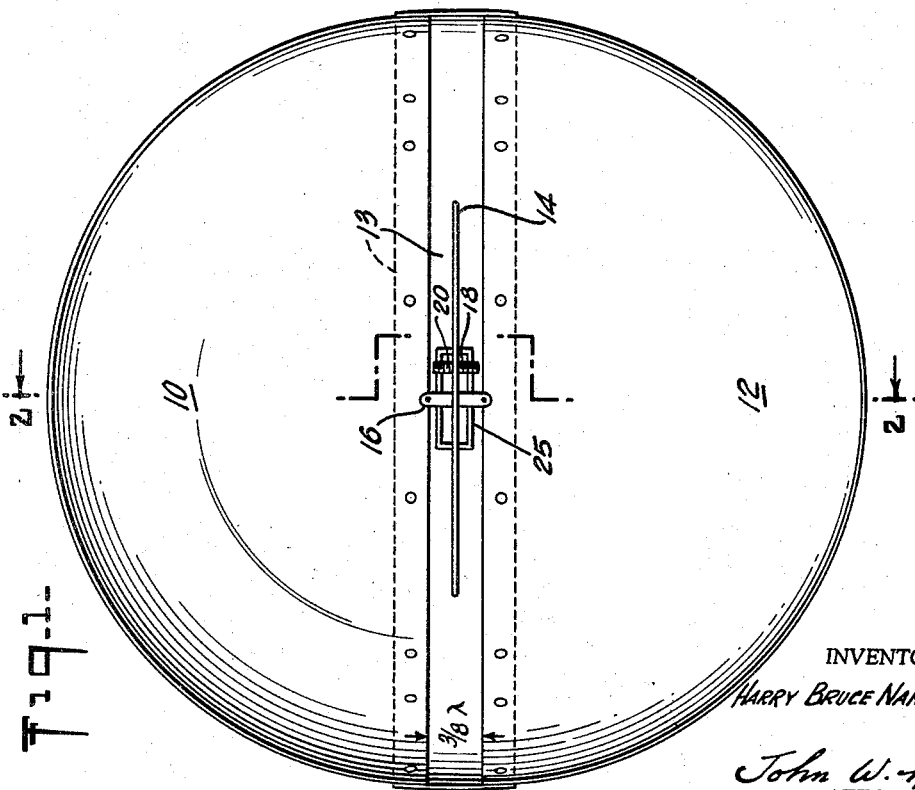
INVENTOR.
HARRY BRUCE NANKERVIS
John W. Hoag
ATTORNEY May 4, 1965  H. B. NANKERVIS  3,182,322
RADAR ANTENNAE
Filed March 6, 1962  2 Sheets-Sheet 2
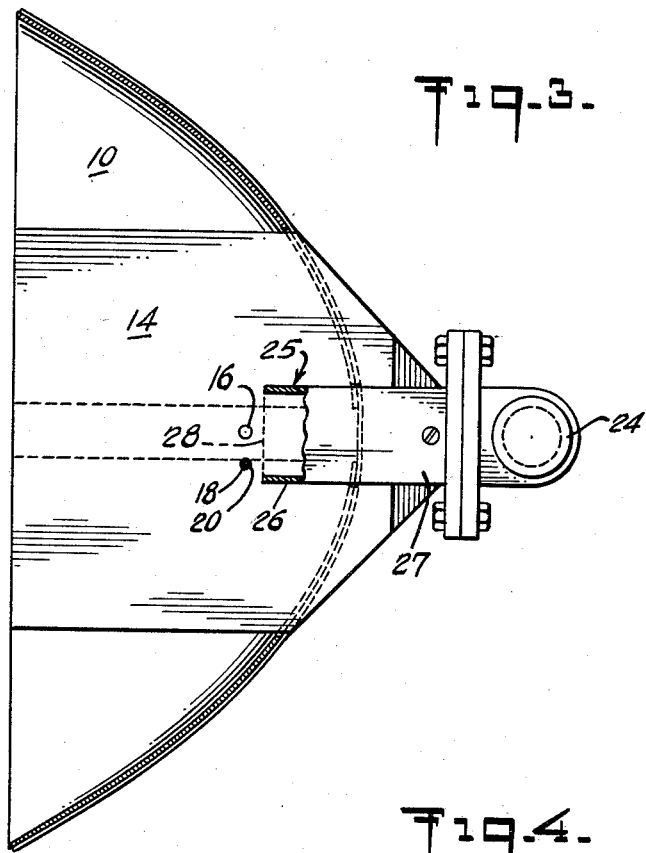
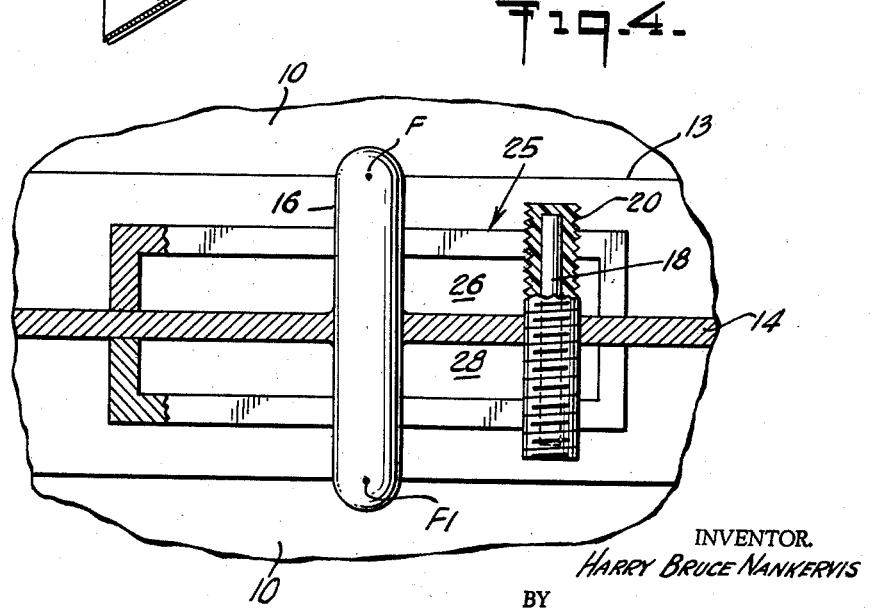
INVENTOR.
HARRY BRUCE NANKERVIS
BY
John W. Hoag
ATTORNEY 3,182,322
RADAR ANTENNAE
Harry Bruce Nankervis, Middletown, N.J., assignor to Stephenson Corporation, Red Bank, N.J., a corporation of New Jersey
Filed Mar. 6, 1962, Ser. No. 177,864
13 Claims. (Cl. 343—8)

This invention relates to radar antenna. One contemplated use is by the police in a system for determining the speed of vehicles.

An object of the invention is to provide an antenna assembly which will be compact and at the same time accurate and reliable.

Another object of the invention is to modify prior art parabolic transmitting and receiving equipment by repositioning the focal points of transmitted and received waves.

Another object of the invention is to provide a device of the above described character in which the "blind spots" (uneven "illumination" of paraboloid, and "shadowing" due to feed systems) found in prior art devices are reduced, thereby increasing the efficiency of the equipment.

Other objects of the invention will be apparent from the description and the drawings. The invention will be best understood if the following description is read in connection with the drawings in which:

FIG. 1 is a front elevation of an embodiment of the invention;

FIG. 2 is a side elevation, partly in section, taken on the line 2—2 of FIG. 1;

FIG. 3 is a plan view partly in section; and

FIG. 4 is a detail view showing in enlarged scale the front end of wave guide 25 divided by septum 14, and the dipole members 16 and 18.

In the embodiment of the invention illustrated in the drawings, an elongated dish is provided comprising portions 10, 13 and 12. Portions 12 and 10 correspond to complementary halves of a parabolic dish, and portion 13 is a means for spacing portions 10 and 12 a measured distance apart. In carrying out the invention one easily understood way is to take a parabolic dish reflector and divide it diametrically into two equal halves 10 and 12, and then move the two halves apart a distance of three-eighths of the wave length of waves to be transmitted and secure them in this position, as for example, by a flat parabolic web 13 which is wide enough to overlap the opposing straight line edges of the paraboloid of revolution sections 10 and 12, and is joined to the sections along their opposed straight edges in any suitable way as by silver soldering.

The resulting dish is divided by a septum 14, the length of which is substantially equal to the depth of the dish. Its width may be the same or up to substantially 25 percent less than the diameter of the dish in its plane. The septum is fabricated from stock of the same material and thickness, usually brass or aluminum, which comprises the wave guide means. A portion of the septum acts as a "common wall" for a split wave guide feed system.

The dish is thus effectively divided in two parts and for convenience we will refer to part 10 as the radiating section and part 12 as the receiving section.

Extending through the septum 14, and at right angles to it are the dipoles 16 and 18 respectively. It will be noted that as shown in FIG. 4, dipole 18, which is a mixer-coupling dipole, is encased in a hollow nylon screw 20, the outer surface of which is screw threaded so that the proportion of screw 20 and, therefore, of mixer coupling dipole 18, which extends into the radiating and receiving portions of the structure respectively, may be varied by rotation of screw 20.

Dipole member 16 is unitary but it will be understood that only the portion extending into the radiating section 10 will radiate waves of the length fed into that section of the device, and that similarly only the portion of member 16 which is within the receiving section 12 will pick up the incoming reflected waves.

A wave guide system is provided which preferably comprises members 27 and 29 and member 25, which is divided into two portions 26 and 28. Wave guide 25 extends into the dish through its rear surface and axially of the dish and the portion within the dish is of reduced height and is divided by the septum 14 into wave guide portions 26 and 28. Septum 14 thus acts as a common wall for the portion of the wave guide feed system which projects into the dish. Preferably a wave guide of desired width is cut in half and the side walls of each half are reduced in height and then placed in opposed relation on opposite sides of septum 14 to provide the portions 26 and 28.

Wave guide portion 26 enters section 10 of the dish and waves to be transmitted from a source of power, such as a reflex klystron tube 24, are fed to it through wave guide means 27 and fed through it into portion 10 of the dish and concentrated upon dipole member 16 which is placed at the focal point F of section 10.

The waves reflected from a chosen target and entering the receiving section 12 of the dish are concentrated upon the focal point F-1 of the dipole member 16 and are delivered by it into wave guide portion 28, and through wave guide means 29 which, as shown in FIG. 2, extends to a choke housing 30 and a microwave mixer detector assembly 32. The resulting selected frequency, which is the difference between the transmitted and the reflected frequencies, may be employed to actuate a speed measuring device 34 which may be of known kind.

The action of the mixer-coupling dipole 18 is to transfer a measured portion of the transmitted waves into section 12 of the dish and deliver the measured portion into wave guide portion 28. Waves of the transmitted frequency are thus fed into wave guide portion 28 along with waves reflected from the target, which, due to the motion of the target, are of greater or lesser length than the transmitted waves.

It will be noted that in the structure described herein the sending and receiving dish is unique. It is not a complete paraboloid of revolution. In front elevation it is slightly oval rather than circular in shape. Its diameter along a line at right angles to the septum 14 is of greater length than its diameter taken in the plane of the septum. This is the result of separating two halves of a paraboloid of revolution by three-eighths of the length of the transmitted waves as is described above. An important result is to move the focal points F and F-1 away from septum 14, preferably to the extent indicated in FIGURE 4, thus focusing on member 16 at its maximum radiation and receiving points. Because F and F-1 are spaced apart they operate as distinct transmitting and receiving means, without being balanced out or out of focus as would be the case if the dish were a complete paraboloid of revolution, in which case these focal points would be midway between the ends of member 16, and identical.

The use within the dish of compact wave guide means formed as described above, comprising two portions of reduced height having a wall in common, has the advantage that it provides a compact structure, which, because of its reduced size, offers a minimum of obstruction to waves being transmitted or received, thus making a greater surface area of sections 10 and 12 useful with the result that nearly full illumination of the reflector surface is achieved.

Further, reducing the height of wave guides 26 and 28 relative to the height of the standard wave guide for waves of the length transmitted decouples their outer walls respectively from the dipole means and improves the Q of the circuit and provides a better match between the klystron and the dipole means.

There has thus been provided a product in which the above mentioned objects are achieved in a thoroughly practical manner.

What is claimed is:

1. In a radar system for measuring the speed of vehicles, in combination, a dish comprising two halves of a parabolic dish separated and joined together at a distance of three-eighths of the length of waves to be transmitted, a septum parallel to the spaced opposed edges of the said halves and dividing the resulting elongated dish diametrically into two portions, a source of waves of the length to be transmitted, a first wave guide extending from said source into one portion of the elongated dish, means in said portion for radiating waves of the length supplied to the dish and hence to the target, a mixer detector assembly, a second wave guide extending into the other portion of the said elongated dish and communicating with said mixer detector assembly, means in the other portion of the dish for concentrating waves reflected from the target and coupling them to the second wave guide, and means for transferring into said other portion of the dish an adjustable measured portion of the transmitted waves and feeding them also into said second wave guide.

2. In a radar system, an antenna comprising, a dish comprising, two halves of a parabolic dish spaced apart a distance equal to three-eighths of the length of waves to be transmitted, with their inner edges disposed in parallel relation and interconnected by means bridging the space between the opposed parallel edge of the halves, and a septum disposed parallel to said edges and dividing the dish into two parts.

3. The device claimed in claim 2 in which the separating and interconnecting means is a flat parabolic web.

4. The device claimed in claim 2 including dipole means disposed at right angles to the septum and aligned with it and extending into both parts of the dish.

5. In a radar system, a dish wave reflector which is longer along a first diameter than along a second diameter at right angles to the first diameter, comprising two parabolic half dish reflectors spaced apart and interconnected by a parabolic web, a septum aligned with the second diameter and dividing the dish, and dipole means disposed transversely of the septum and separating the focal points of the transmitted and received waves.

6. The device claimed in claim 5 having separate wave guide means extending into the dish through its rear surface on opposite sides of said septum and disposed in operative relation to the focal points of the dipole means on opposite sides of the septum respectively.

7. A radar antenna comprising, a dish reflector divided into transmitting and receiving portions, first wave guide means communicating between the transmitting portion of the dish and a source of waves to be transmitted, second wave guide means communicating between the receiving portion of the dish and a micro-wave detector assembly, first dipole means comprising a focal point disposed in the transmitting portion of the dish and a second point disposed in the receiving portion of the dish, and a mixer-coupling dipole member having a portion disposed in the transmitter part of the dish and having a portion disposed in the receiver part of the dish.

8. A radar antenna comprising, a dish reflector divided into transmitting and receiving portions, first wave guide means communicating between the transmitting portion of the dish and a source of waves to be transmitted, second wave guide means communicating between the receiving portion of the dish and a micro-wave detector assembly, a first resonating means disposed in the transmitting portion of the dish, a second resonating means disposed in the receiving portion of the dish, and a mixer-coupling dipole having a portion disposed in the transmitter part of the dish and a portion disposed in the receiver part of the dish.

9. A radar antenna comprising, two parabolic half dish reflectors spaced apart with their inner edges interconnected by a flat parabolic web, a septum dividing the resulting reflector into transmitting and receiving portions, means for radiating waves to be transmitted, and means for picking up incoming reflected waves, said means each having its focal point spaced outwardly from the septum in the direction of the inner edge of one of the reflector halves.

10. A radar antenna comprising, two parabolic half dish reflectors spaced apart with their inner edges parallel and interconnected by a flat parabolic web, a septum dividing the resulting reflector into transmitting and receiving portions, and resonant radiating and pick up means extending outwardly from the septum into the transmitting and receiving portions respectively a distance sufficient to separate the focal points of the transmitted and received waves by an amount substantially equal to the width of the spacing between the two half dish reflectors.

11. A radar antenna comprising, two parabolic half dish reflectors spaced apart with their inner edges parallel and interconnected by a flat parabolic web, a septum dividing the resulting reflector into transmitting and receiving portions, and resonant radiating and pick up means extending outwardly from the septum into the transmitting and receiving portions respectively a distance sufficient to dispose the focal points of the transmitted and received waves substantially in horizontal alignment with the inner edges of the spaced apart parabolic dish reflector halves.

12. In a radar system, a dish wave reflector which is longer along the first diameter than along the second diameter at right angles to the first diameter, a septum aligned with the second diameter and dividing the dish, and a dipole disposed transversely of the septum, separate wave guide means extending into the dish through its rear surface on opposite sides of the septum and disposed in operative relation to the focal points of the dipole means on opposite sides of the septum respectively, the portions of the wave guide means extending into the dish comprising two channel members disposed in parallel relation and on opposite sides of the septum respectively with their side walls in opposed relation on opposite surfaces of the septum which thus completes both wave guide portions and provides them with a side wall in common.

13. In a radar system, a dish wave reflector which is longer along the first diameter than along the second diameter at right angles to the first diameter, a septum aligned with the second diameter and dividing the dish and a dipole disposed transversely of the septum, separate wave guide means extending into the dish through its rear surface on opposite sides of the septum and disposed in operative relation to the focal points of the dipole means on opposite sides of the septum respectively, the sum of the height of the separate wave guides which extend into the dish plus the thickness of the septum being less than the height of a wave guide of standard size for waves of the length to be transmitted.

References Cited by the Examiner

UNITED STATES PATENTS

| | | | |
|---|---|---|---|
| 2,605,419 | 7/52 | Van Atta | 343—912 |
| 2,929,059 | 3/60 | Parker | 343—16 |
| 3,120,640 | 2/64 | Midlock | 343—8 |

CHESTER L. JUSTUS, *Primary Examiner.*